(12) United States Patent
Iwai et al.

(10) Patent No.: US 10,780,723 B2
(45) Date of Patent: Sep. 22, 2020

(54) ELECTRIC APPARATUS AND CONTROL METHOD THEREFOR

(71) Applicant: CANON KABUSHIKI KAISHA, Tokyo (JP)

(72) Inventors: Isao Iwai, Saitama (JP); Kota Kiyama, Kawasaki (JP); Haruhiko Tanami, Fuchu (JP); Yuichiro Suzuki, Yokohama (JP)

(73) Assignee: Canon Kabushihki Kaisha, Tokyo (JP)

( * ) Notice: Subject to any disclaimer, the term of this patent is extended or adjusted under 35 U.S.C. 154(b) by 0 days.

(21) Appl. No.: 16/386,581

(22) Filed: Apr. 17, 2019

(65) Prior Publication Data

US 2019/0335057 A1    Oct. 31, 2019

(30) Foreign Application Priority Data

Apr. 27, 2018 (JP) ................... 2018-087537

(51) Int. Cl.
*B41J 19/20* (2006.01)
(52) U.S. Cl.
CPC .................. *B41J 19/202* (2013.01)
(58) Field of Classification Search
CPC ...... B41J 19/202; B41J 19/207; H04N 1/2307
See application file for complete search history.

(56) References Cited

U.S. PATENT DOCUMENTS

| | | | |
|---|---|---|---|
| 5,384,525 A | 1/1995 | Kato | |
| 8,154,227 B1* | 4/2012 | Young | A63H 30/04 318/255 |
| 8,573,727 B2 | 11/2013 | Iwai | |
| 2003/0137273 A1* | 7/2003 | Davidov | H02P 8/14 318/685 |
| 2006/0147237 A1* | 7/2006 | Hayashi | B41J 19/202 400/76 |
| 2013/0184868 A1* | 7/2013 | Inazumi | B25J 9/1605 700/258 |

(Continued)

FOREIGN PATENT DOCUMENTS

JP    H05-134758 A    6/1993

OTHER PUBLICATIONS

U.S. Appl. No. 16/390,544, Yuichiro Suzuki Eriko Uchida, filed Apr. 22, 2019.

(Continued)

*Primary Examiner* — Julian D Huffman
(74) *Attorney, Agent, or Firm* — Venable LLP

(57) ABSTRACT

An apparatus for controlling movement of a target object generates a first operation quantity for first feedback control, and determines a second operation quantity for second feedback control in accordance with which of plural regions obtained by dividing a two-dimensional space defined by two variables of the first and second state quantities includes the first and second state quantities. The plural regions include first, second and third regions, the first region being provided between the second and third regions. The second operation quantity is determined so that the second operation quantity when the first and second state quantities are located in the first region is less than the second operation quantity when the first and second state quantities are located in the second region or the third region.

20 Claims, 7 Drawing Sheets

(56) References Cited

U.S. PATENT DOCUMENTS

| | | | |
|---|---|---|---|
| 2015/0314619 A1* | 11/2015 | Tanami | B41J 25/006 347/39 |
| 2016/0077500 A1* | 3/2016 | Cho | H02P 29/027 318/561 |
| 2017/0146971 A1* | 5/2017 | Ono | G05B 19/106 |
| 2017/0146981 A1* | 5/2017 | Ono | G05B 11/42 |
| 2017/0217230 A1* | 8/2017 | Yokozawa | G06K 15/40 |
| 2019/0329573 A1* | 10/2019 | Kiyama | H02P 23/20 |
| 2019/0335055 A1* | 10/2019 | Suzuki | B41J 19/207 |
| 2019/0335056 A1* | 10/2019 | Tanami | B41J 29/38 |

OTHER PUBLICATIONS

U.S. Appl. No. 16/390,569, Kota Kiyama Yuichiro Suzuki Isao Iwai Haruhiko Tanami, filed Apr. 22, 2019.
U.S. Appl. No. 16/390,594, Haruhiko Tanami Yuichiro Suzuki Isao Iwai Kota Kiyama, filed Apr. 22, 2019.

* cited by examiner

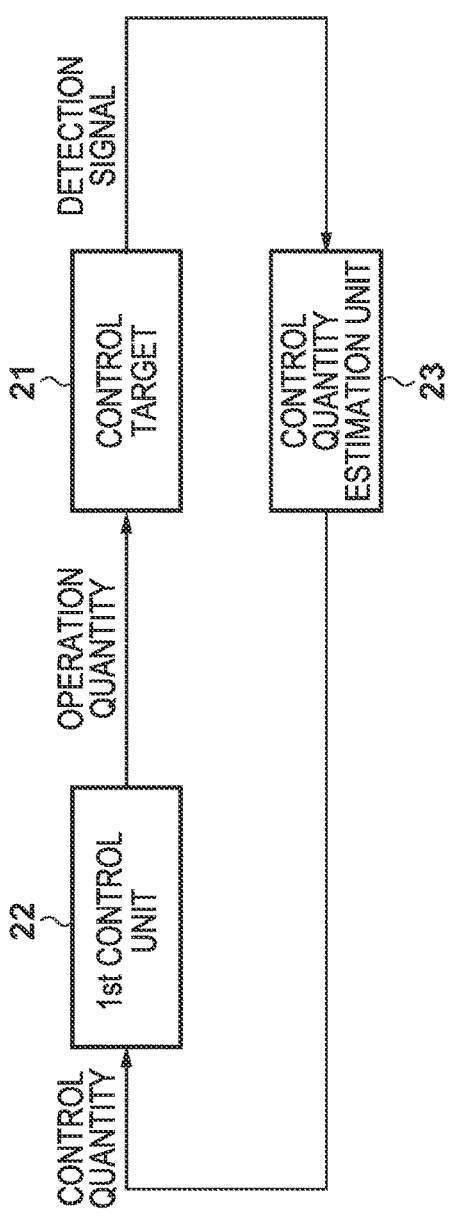
F I G. 1A
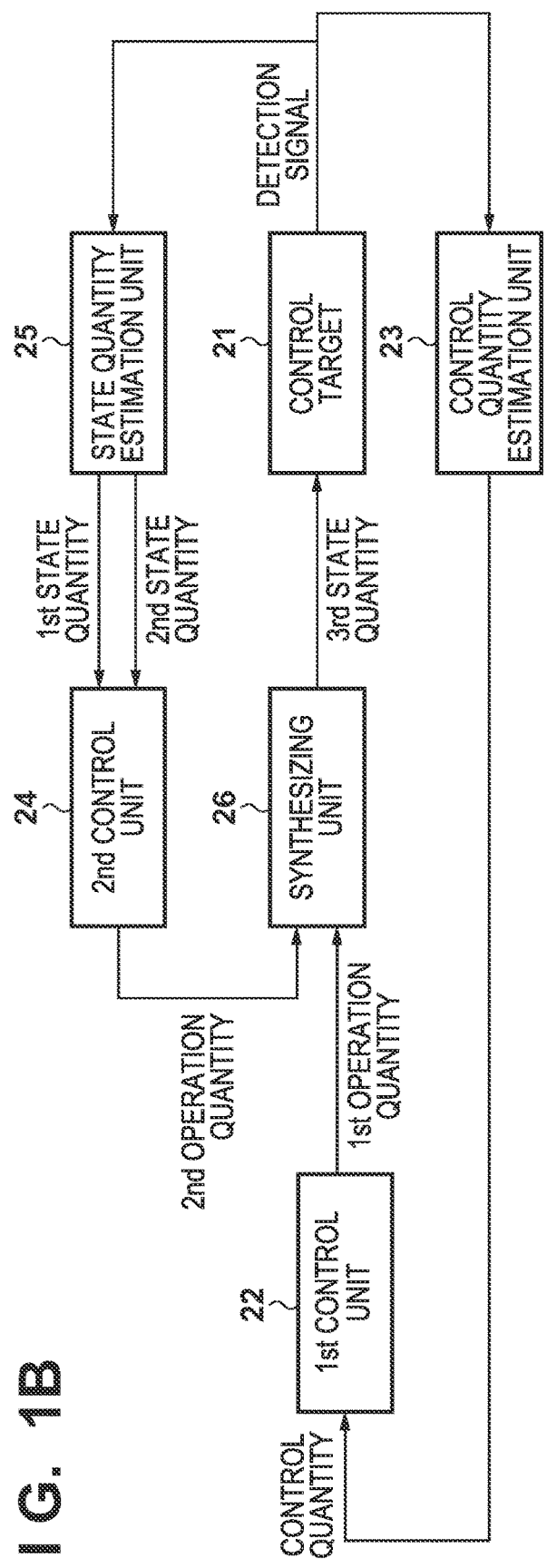
F I G. 1B

VELOCITY PROFILE

ELECTRIC APPARATUS AND CONTROL METHOD THEREFOR

BACKGROUND OF THE INVENTION

Field of the Invention

The present invention relates to an electric apparatus and a control method therefor, and particularly to a technique of controlling driving of a moving object such as the carriage of a serial type printing apparatus.

Description of the Related Art

As for driving of a carriage that reciprocally moves by a motor in a serial type printer, feedback control such as PID control using an encoder is common practice. In a serial type inkjet printer, a driving unit that scans a carriage mounted with a printhead for discharging ink emphasizes a velocity vibration at the time of scanning the carriage to stabilize an ink landing position. Thus, it is required to implement control for stabilizing a velocity vibration of the carriage.

However, the velocity vibration of the carriage may be different for each individual printer due to variations of components. Especially in the structure of a carriage motor, a torque vibration called a cogging torque or the like worsens the velocity vibration. The magnitude and the like of the cogging torque are different between individual carriage motors, and the cogging torque is influenced by variations of the remaining parts. Thus, it is difficult to implement a stable velocity vibration in each printer.

Japanese Patent Laid-Open No. H5-134758 proposes a control method of applying sliding mode control, improving the external disturbance suppression performance, and ensuring the improvement of the control performance with good traceability for a command.

However, the control method proposed in Japanese Patent Laid-Open No. H5-134758 assumes that control input is switched at high speed. If, however, there is a calculation delay or a delay in acquisition of a state quantity necessary for feedback control, the switching timing may shift. The velocity vibration of the carriage may be further worsened in accordance with the amount of the shift.

SUMMARY OF THE INVENTION

Accordingly, the present invention is conceived as a response to the above-described disadvantages of the conventional art.

For example, an electric apparatus and a control method therefor according to this invention are capable of reducing velocity vibration of a control target object.

According to one aspect of the present invention, there is provided an electric apparatus for controlling movement of a target object, comprising: a detection unit configured to detect the movement of the target object; a generation unit configured to generate, based on a detection signal output from the detection unit, a first operation quantity for first feedback control for the target object at a first period; an estimation unit configured to estimate, based on the detection signal output from the detection unit, a first state quantity of the target object and a second state quantity obtained by time differentiation of the first state quantity in order to perform second feedback control for the target object at a second period shorter than the first period; and a determination unit configured to determine a second operation quantity for the second feedback control, in accordance with which of a plurality of regions includes the first state quantity and the second state quantity, the plurality of regions being obtained by dividing a two-dimensional space defined by two variables of the first state quantity and the second state quantity estimated by the estimation unit, wherein the target object is controlled based on the first operation quantity and the second operation quantity, the plurality of regions include a first region, a second region and a third region, the first region being provided between the second region and the third region, and the determination unit determines the second operation quantity so that the second operation quantity in a case where the first state quantity and the second state quantity are located in the first region is smaller than the second operation quantity in a case where the first state quantity and the second state quantity are located in the second region or the third region.

According to another aspect of the present invention, there is provided a control method for an electric apparatus for controlling movement of a target object, comprising: detecting the movement of the target object; generating, based on a detection signal acquired in the detecting, a first operation quantity for first feedback control for the target object at a first period; estimating, based on the detection signal acquired in the detecting, a first state quantity of the target object and a second state quantity obtained by time differentiation of the first state quantity in order to perform second feedback control for the target object at a second period shorter than the first period; and determining a second operation quantity for the second feedback control, in accordance with which of a plurality of regions includes the first state quantity and the second state quantity, the plurality of regions being obtained by dividing a two-dimensional space defined by two variables of the estimated first state quantity and the estimated second state quantity, wherein the target is controlled based on the first operation quantity and the second operation quantity, the plurality of regions include a first region, a second region and a third region, the first region being provided between the second region and the third region, and the second operation quantity is determined so that the second operation quantity in a case where the first state quantity and the second state quantity are located in the first region is smaller than the second operation quantity in a case where the first state quantity and the second state quantity are located in the second region or the third region.

The invention is particularly advantageous since it is possible to reduce velocity vibration of a control target object.

Further features of the present invention will become apparent from the following description of exemplary embodiments (with reference to the attached drawings).

BRIEF DESCRIPTION OF THE DRAWINGS

FIGS. 1A and 1B are block diagrams each showing a feedback control arrangement in a driving control unit of a carriage motor of a printing apparatus;

DESCRIPTION OF THE EMBODIMENTS

Figure 2:
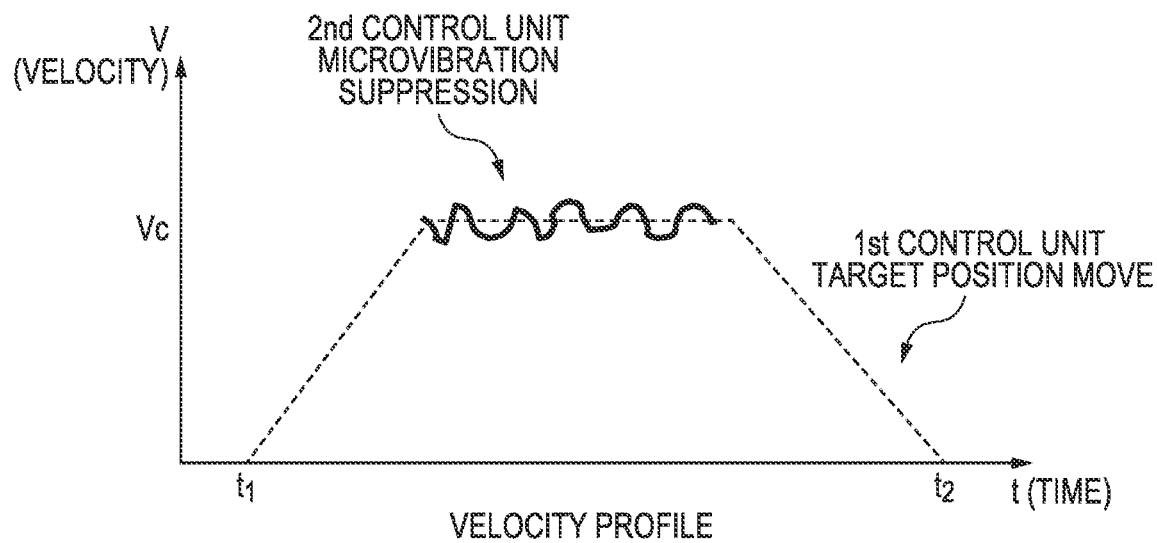
FIG. 2 is a timing chart showing a velocity profile of a carriage as a control target.

Exemplary embodiments of the present invention will now be described in detail in accordance with the accompanying drawings.

In the following description, control of driving of a motor that moves a carriage of a serial type printing apparatus as an exemplary example of an electric apparatus will be exemplified. However, the present invention is not limited to the carriage of the printing apparatus, and motor control according to the present invention is applicable to any unit that moves an object by driving a motor. For example, in the printing apparatus, motor control is applicable to control of driving of a conveyance motor used to convey a print medium such as a print sheet. The present invention also includes a scanner apparatus that optically reads an image of an original while moving a CCD line scanner or CIS by driving a motor.

1. Explanation of Feedback Control

FIGS. 1A and 1B are block diagrams each showing a feedback control arrangement in a driving control unit of a carriage motor of a printing apparatus. FIG. 1A is a block diagram showing a general control arrangement. FIG. 1B is a block diagram showing a control arrangement used in this embodiment.

First, the general feedback control arrangement will be described with reference to FIG. 1A.

As shown in FIG. 1A, a detection signal (the position and velocity of a carriage) that detects the state of a control target (for example, a carriage) 21 is output to a control quantity estimation unit (for example, a CPU) 23 to estimate the control quantity of position/velocity information or the like. The control quantity is output to a first control unit (for example, a carriage driver) 22 to calculate an operation quantity for converging the control target 21 to a target value. When the operation quantity is output to the control target 21, a feedback control loop is formed.

To stably move the control target, it is necessary to set various parameters while ensuring an allowance in terms of control in consideration of the characteristic of the control target. If the allowance is insufficient, a vibration occurs, and an oscillation phenomenon may lead to an uncontrollable state. On the other hand, if the allowance is too large, the traceability performance of the control target deteriorates but it is unavoidable to impose a restriction on the traceability performance for vibration suppression.

Next, the feedback control arrangement used in this embodiment will be described with reference to FIG. 1B.

As shown in FIG. 1B, in feedback control, in addition to the feedback control loop shown in FIG. 1A, another feedback control loop using the detection signal from the control target 21 is formed. That is, the detection signal that detects the state of the control target 21 is output to the control quantity estimation unit 23 to estimate the control quantity of the position/velocity information of the carriage or the like. The control quantity is output to the first control unit 22, and the first control unit 22 calculates the first operation quantity for converging the control target 21 to the target value. Then, the first control unit 22 outputs the first operation quantity to the control target 21 via the synthesizing unit 26, thereby forming the first feedback loop.

On the other hand, the detection signal that detects the state of the control target 21 is also output to a state quantity estimation unit 25, and the state quantity estimation unit 25 estimates the first and second state quantities. The second state quantity is obtained by the time differentiation of the first state quantity. More specifically, the first and second state quantities are values formed from a combination of a position and a velocity or a combination of a velocity and an acceleration. These values are output to a second control unit 24. The second control unit 24 calculates the second operation quantity. Next, the second control unit 24 outputs the second operation quantity, and a synthesizing unit 26 synthesizes the first and second operation quantities, and outputs a synthesizing result to the control target 21. The second feedback loop "control target 21→state quantity estimation unit 25→second control unit 24→synthesizing unit 26→control target 21" is formed.

Since the first and second state quantities have the relationship between, for example, the position (x) and velocity (v) of the carriage or between the velocity (v) and acceleration (a) of the carriage, the relationship between the two state quantities (two variables) can be represented by a two-dimensional space.

An example in which the feedback control shown in FIG. 1B is applied to control of the velocity of the carriage that reciprocates while being mounted with a printhead in the serial type printing apparatus will now be described.

FIG. 2 is a timing chart showing the velocity profile of the carriage as the control target.

Figure 3:
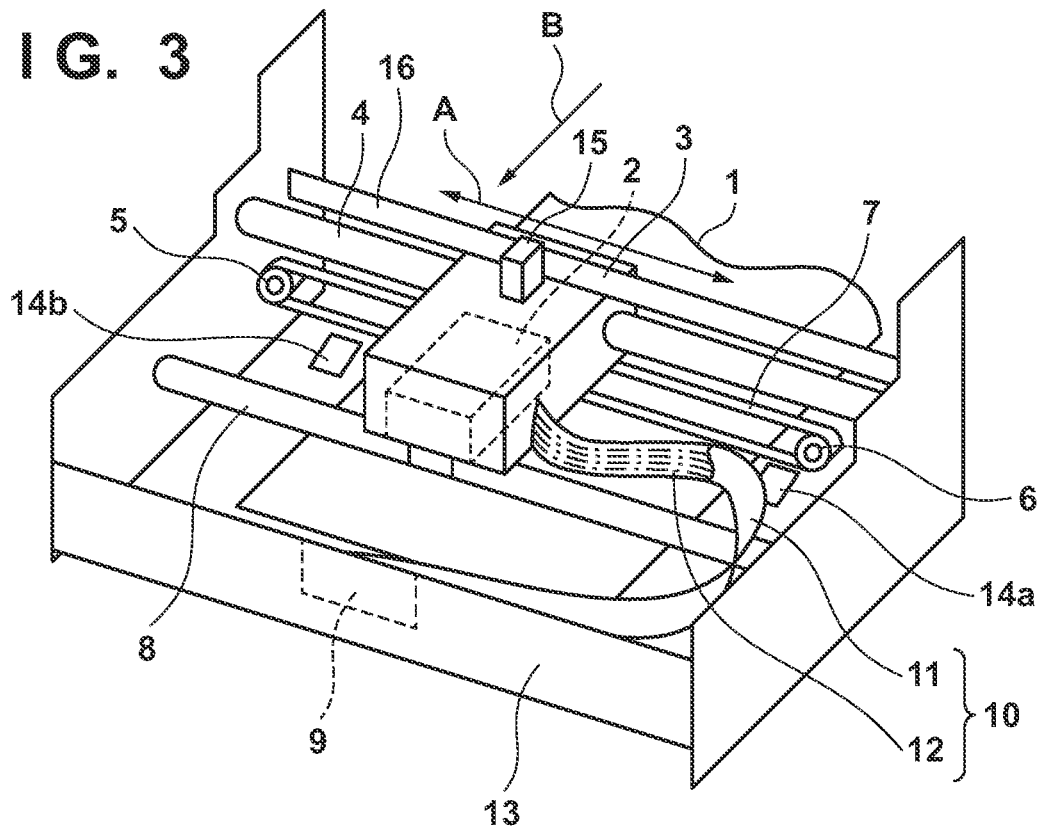
FIG. 3 is a perspective view showing the main mechanism part of an inkjet printing apparatus according to an exemplary embodiment of the present invention.

Referring to FIG. 2, the abscissa represents time (t) and the ordinate represents the velocity (v) of the carriage. FIG. 3 shows the velocity profile in which the carriage starts to move from a home position at $t=t_1$, accelerates to reach a velocity $v_c$, transitions to constant movement, and then decelerates to stop at $t=t_2$. However, the actual carriage motion is not ideal, and the velocity of the carriage micro-vibrates due to the influence of an external disturbance or the like during constant movement. The micro-vibration of the velocity indicates the occurrence of positive and negative accelerations at a very short period.

In FIG. 2, the ideal velocity profile is indicated by a broken line and a micro-velocity vibration during constant movement is indicated by a thick solid line.

In the feedback control according to this embodiment, the first control unit 22 is responsible for control of the velocity profile indicated by the broken line, and moves the carriage as control target to a target position in accordance with a desired acceleration condition and velocity condition. The first control unit 22 executes PID control calculation generally widely used, sets various parameters in consideration of an allowance in terms of control, determines a control band, and then implements desired movement while suppressing a vibration in the control band.

On the other hand, the second control unit 24 is responsible for control of suppressing a micro-velocity vibration indicated by the thick solid line. The second control unit 24 suppresses a vibration phenomenon (velocity vibration) in a high-frequency band exceeding the control band of the first control unit 22. To suppress such velocity vibration, it is necessary to perform, at a short period corresponding to the period of the velocity vibration, an operation of giving a positive acceleration as an operation quantity for a negative acceleration that occurs while giving a negative acceleration as an operation quantity for a positive acceleration that occurs. Therefore, since a sufficiently short control period is required to implement the control performance, the second control unit 24 executes control at a control period at least shorter than that of the first control unit 22.

When the control period is sufficiently short, the second control unit 24 can implement a high-speed switching operation, and can perform vibration suppression (velocity vibration suppression) up to a region exceeding the control band of the first control unit 22. Therefore, even if the state of the carriage as the control target changes and a vibration phenomenon occurs when only feedback control by the first control unit 22 is performed, the second control unit 24 can suppress a vibration to build a stable control system without spoiling the traceability.

In summary, the role of the first control unit 22 that performs the conventional feedback control is to converge, to the target position, the carriage as the control target having the velocity profile formed from acceleration, a constant velocity, and deceleration. The first control unit 22 forms a feedback loop (first feedback loop) by PID control using the control quantity formed from the position and velocity information of the carriage. On the other hand, the role of the second control unit 24 is to suppress a micro-velocity vibration of the carriage that cannot be controlled by the first control unit 22. The second control unit 24 forms a feedback loop (second feedback loop) by high-speed switching control using a state quantity formed from a combination of a position and a velocity or a velocity and an acceleration. Therefore, control of the second feedback loop is executed at a calculation period shorter than that of the first feedback loop.

2. Explanation of Application Example of Feedback Control

A serial type printing apparatus to which control of forming the two feedback loops explained with reference to FIG. 1B is applied will be described.

<Explanation of Printing Apparatus (FIGS. 3 and 4)>

FIG. 3 is an external perspective view showing the arrangement of the printing apparatus mounted with an inkjet printhead (to be referred to as a printhead hereinafter) that discharges ink droplets in accordance with an inkjet method, according to the exemplary embodiment of the present invention.

A carriage (moving object) 3 mounted with a printhead 2 is supported slidably by a guide shaft 4, and reciprocally moves above a print medium (sheet) 1. A carriage motor (DC motor) 5 with a pulley is arranged at one end of the moving range of the carriage 3, an idle pulley 6 is arranged at the other end, and a timing belt 7 is looped between the carriage motor 5 and the idle pulley 6, thereby connecting the carriage 3 to the timing belt 7.

To prevent the carriage 3 from rotating about the guide shaft 4, a support member 8 installed to extend in parallel to the guide shaft 4 is installed, and the carriage 3 is also supported slidably by the support member 8. In the printhead 2, a number of print elements are provided and an FFC (Flexible Flat Cable) 11 for supplying the driving signals of the print elements from the main body portion of the printing apparatus to the printhead 2 is arranged. The FFC 11 has a long thin film shape, a conductive pattern for transmitting a driving signal is formed in the inside or surface of the FFC 11, and the FFC 11 has flexibility so that it bends along with the movement of the carriage 3 to move the central position of bending.

Furthermore, an ink tank (not shown) is arranged outside the carriage 3, and a tube 12 that supplies, to the printhead 2, ink contained in the ink tank is provided. The tube 12 has flexibility so that it bends along with the movement of the carriage 3 to move the central position of bending. A connecting member 10 formed from the FFC 11 and the tube 12 is connected between the carriage 3 and a fixing portion 9 of the main body 13 of the printing apparatus.

Furthermore, a linear scale 16 that is used to acquire the position information of the carriage 3 is arranged in parallel to the moving direction (main scanning direction) of the carriage, and is configured to be read by an encoder sensor 15 attached to the carriage 3. Ink collection ports 14a and 14b for collecting ink preliminarily discharged by the printhead 2 are provided on both the outsides in the width direction of the print medium 1. The preliminary discharge indicates an operation for discharging, at positions irrelevant to printing, ink adhered to the distal end portions of nozzles immediately before the start of printing or during execution of printing.

With this arrangement, the carriage 3 reciprocally moves in a direction (main scanning direction) of an arrow A. The print medium 1 is conveyed by a conveyance motor (not shown) in a direction (sub-scanning direction) of an arrow B vertically intersecting the carriage 3.

Figure 4:
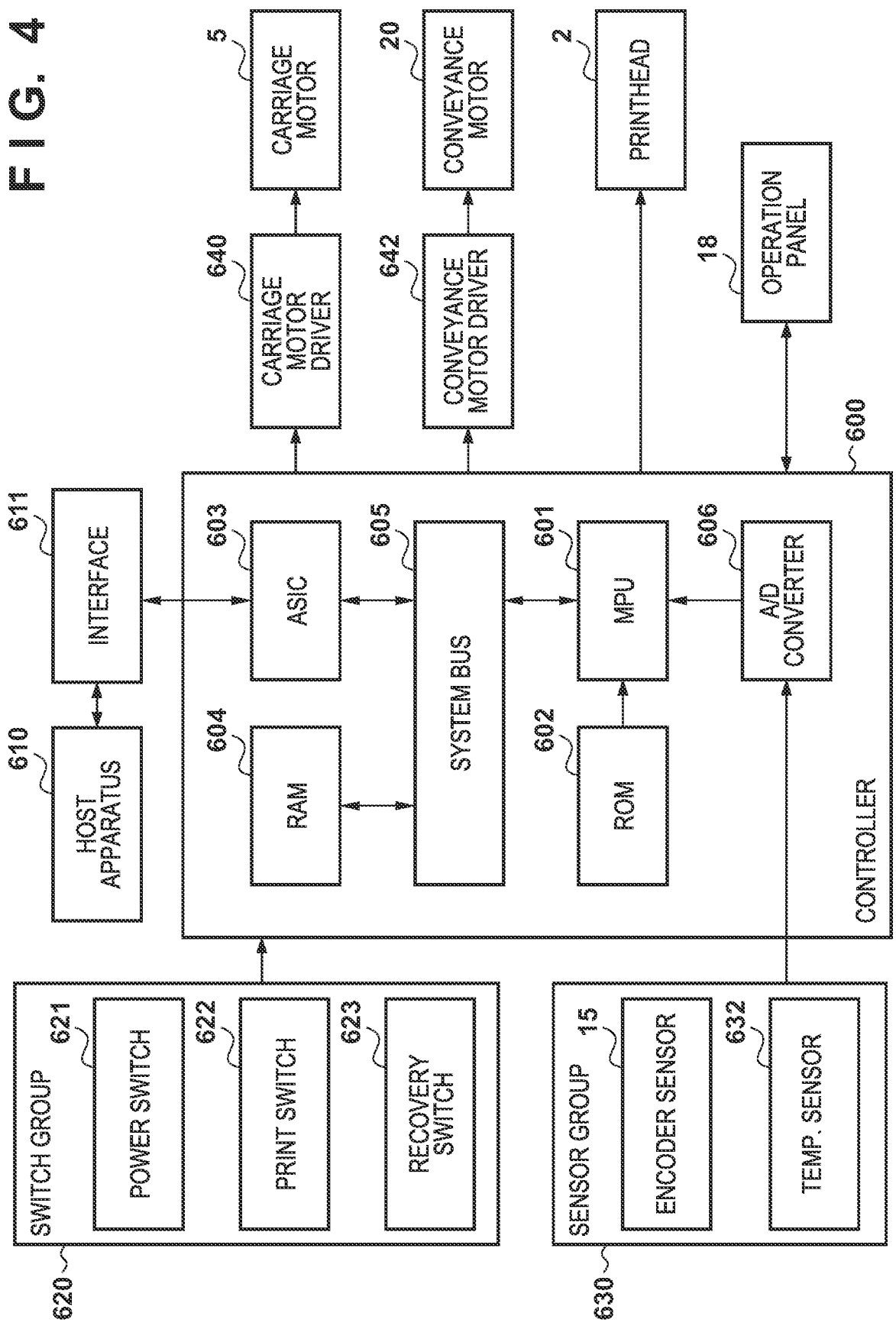
FIG. 4 is a block diagram showing an overview of the control arrangement of the printing apparatus shown in FIG. 3.

FIG. 4 is a block diagram showing the control arrangement of the printing apparatus shown in FIG. 3.

As shown in FIG. 4, a controller 600 is formed by an MPU 601, a ROM 602, an ASIC (Application Specific Integrated Circuit) 603, a RAM 604, a system bus 605, an A/D converter 606, and the like. The ROM 602 stores a program corresponding to a control sequence (to be described later), a required table, and other fixed data.

The ASIC 603 generates control signals for controlling the carriage motor 5, a conveyance motor 20, and the printhead 2. The RAM 604 is used as a loading area of image data, a work area for executing a program, and the like. The system bus 605 interconnects the MPU 601, the ASIC 603, and the RAM 604 to exchange data. The A/D converter 606 receives an analog signal from a sensor group (to be described below), performs A/D conversion, and supplies a digital signal to the MPU 601.

Referring to FIG. 4, reference numeral 610 denotes a host apparatus serving as an image data supply source. Image data, a command, a status, and the like are transmitted/received between the host apparatus 610 and the printing apparatus via an interface (I/F) 611 using, for example, a protocol based on the USB standard.

Furthermore, reference numeral 620 denotes a switch group which is formed from a power switch 621, a print switch 622 used to issue a print start instruction or the like, a recovery switch 623, and the like.

Reference numeral 630 denotes a sensor group for detecting an apparatus status, which is formed from the encoder sensor 15, a temperature sensor 632, and the like.

Reference numeral 640 denotes a carriage motor driver that drives the carriage motor 5 for causing the carriage 3 to reciprocally scan in the direction of the arrow A; and 642, a conveyance motor driver that drives the conveyance motor 20 for conveying a print medium P.

At the time of print scanning by the printhead 2, the ASIC 603 transfers data for driving the print elements (heaters for discharge) to the printhead 2 while directly accessing the memory area of the RAM 604. In addition, this printing apparatus includes, as a user interface, an operation panel 18 formed by an LCD or LED. From the viewpoint of apparatus implementation, the switch group 620 may be included in the operation panel 18.

The ASIC 603 operates as a calculation processing unit to perform image processing and actuator control, and executes calculation processing by receiving a command from the MPU 601. Feedback control calculation is partially executed by the ASIC 603, and details thereof will be described later. The MPU 601 is responsible for part of calculation for feedback control of the carriage 3, and executes driving calculation of the carriage motor 5 in accordance with a print sequence. When the host apparatus 610 issues a print command via the interface 611, the carriage 3 reciprocally operates for a print operation.

3. Details of Feedback Control Arrangement for Carriage Control of Printing Apparatus Application of the feedback control arrangement described with reference to FIG. 1B to carriage driving control in the printing apparatus described with reference to FIGS. 3 and 4 will be described in detail.

Figure 5:
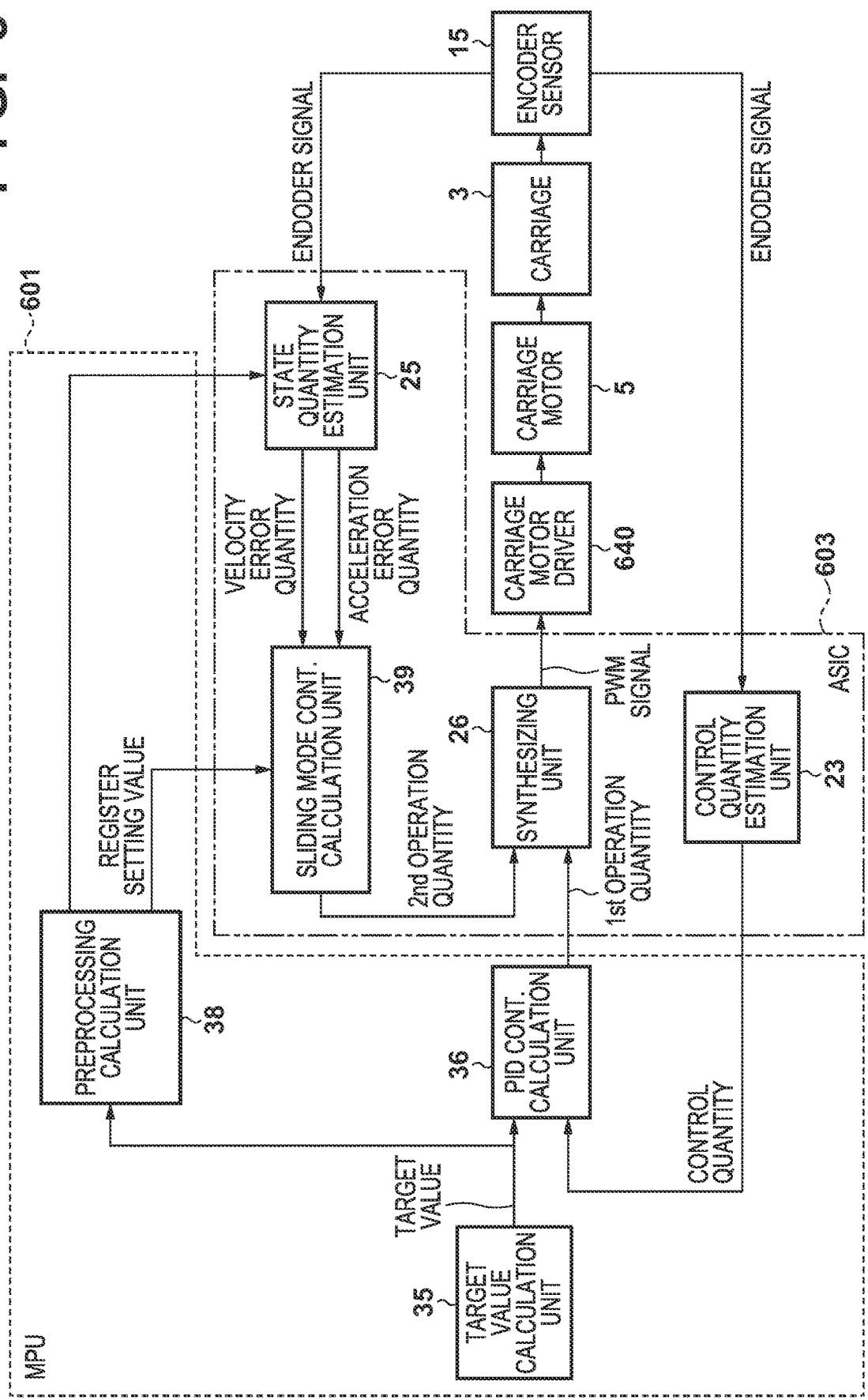
FIG. 5 is a block diagram for explaining details of carriage driving control in the printing apparatus shown in FIGS. 3 and 4.

FIG. 5 is a block diagram for explaining details of carriage driving control in the printing apparatus shown in FIGS. 3 and 4.

Accuracy for causing ink to land at a correct position is required for carriage control of the printing apparatus in order to ensure the print quality by the printhead 2. An ink droplet discharge timing from the printhead 2 is calculated from the moving velocity (v) of the carriage 3, and it is important to minimize a velocity vibration. To achieve this, a vibration target to be suppressed in the feedback control according to this embodiment is the velocity of the carriage. Therefore, the first and second state quantities in the feedback control described with reference to FIG. 1B are formed from a combination of the velocity and acceleration of the carriage 3, and are input to the second control unit 24.

Furthermore, the control target in the feedback control is the carriage 3, and the encoder sensor 15 outputs encoder signals to the control quantity estimation unit 23 and the state quantity estimation unit 25. In general, two A- and B-phase pulse signals whose phases are different from each other by 90° are used as encoder signals. In this embodiment as well, two A- and B-phase pulse signals are used as the encoder signals.

Figure 6:
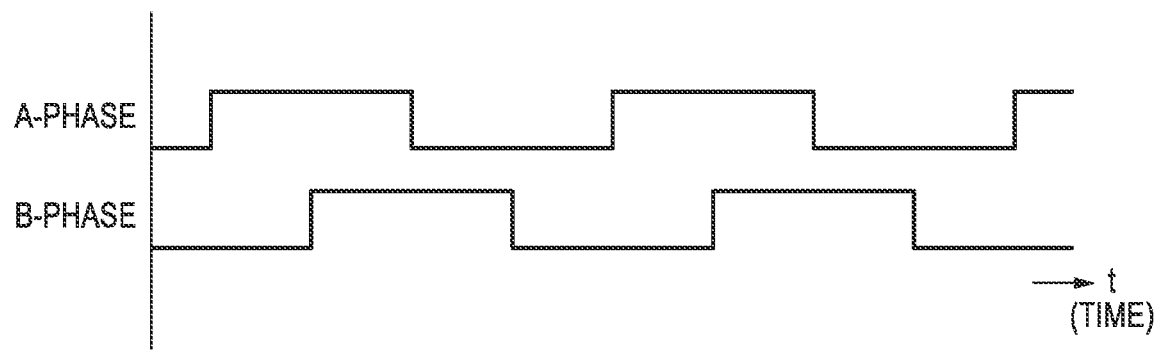
FIG. 6 is a timing chart showing A- and B-phase encoder signals.

FIG. 6 is a timing chart showing the A- and B-phase encoder signals.

The control quantity estimation unit 23 estimates position information by counting the pulse signal, and estimates velocity information by measuring the pulse width of the pulse signal. This position/velocity information or the like is output as a control quantity to a PID control calculation unit 36 corresponding to the first control unit 22.

A target value calculation unit 35 generates a target profile for moving the carriage 3 to a target position in accordance with a desired acceleration condition and velocity condition, and outputs the target profile as a target value. The PID control calculation unit 36 performs PID control calculation using the target value from the target value calculation unit 35 and the control quantity from the control quantity estimation unit 23, and outputs a calculation result as the first operation quantity.

The encoder signal from the encoder sensor 15 is also output to the state quantity estimation unit 25. The state quantity estimation unit 25 also receives a register setting value output from a preprocessing calculation unit 38. The register setting value is a value obtained by replacing, by the preprocessing calculation unit 38, the target value from the target value calculation unit 35 by a value in a unit system used in the state quantity estimation unit 25. The state quantity estimation unit 25 estimates velocity information and acceleration information from the encoder signal, and calculates an error quantity with respect to the register setting value as an operation target. A velocity error quantity and acceleration error quantity as the error quantity are output, as a combination of state quantities in the velocity dimension and acceleration dimension, to a sliding mode control calculation unit 39 corresponding to the second control unit 24.

Since the first and second state quantities have, for example, the relationship between the velocity (v) and acceleration (a) of the carriage, the relationship between the two state quantities (two variables) can be represented by a two-dimensional space.

The sliding mode control calculation unit 39 divides, into a plurality of regions, a two-dimensional plane space formed from two variables of a velocity error quantity and an acceleration error quantity using division lines (switchover lines) each defined by a linear function given by:

velocity error quantity=switchover coefficient×acceleration error quantity+constant Then, it is determined which of the plurality of divided regions includes the obtained velocity error quantity and acceleration error quantity. A value determined for each region based on a region determination result is output as the second operation quantity. Note that the two-dimensional plane space need not be divided by the sliding mode control calculation unit 39. For example, a two-dimensional space region divided into a plurality of regions in advance may be defined by the sliding mode control calculation unit 39.

Figure 7:
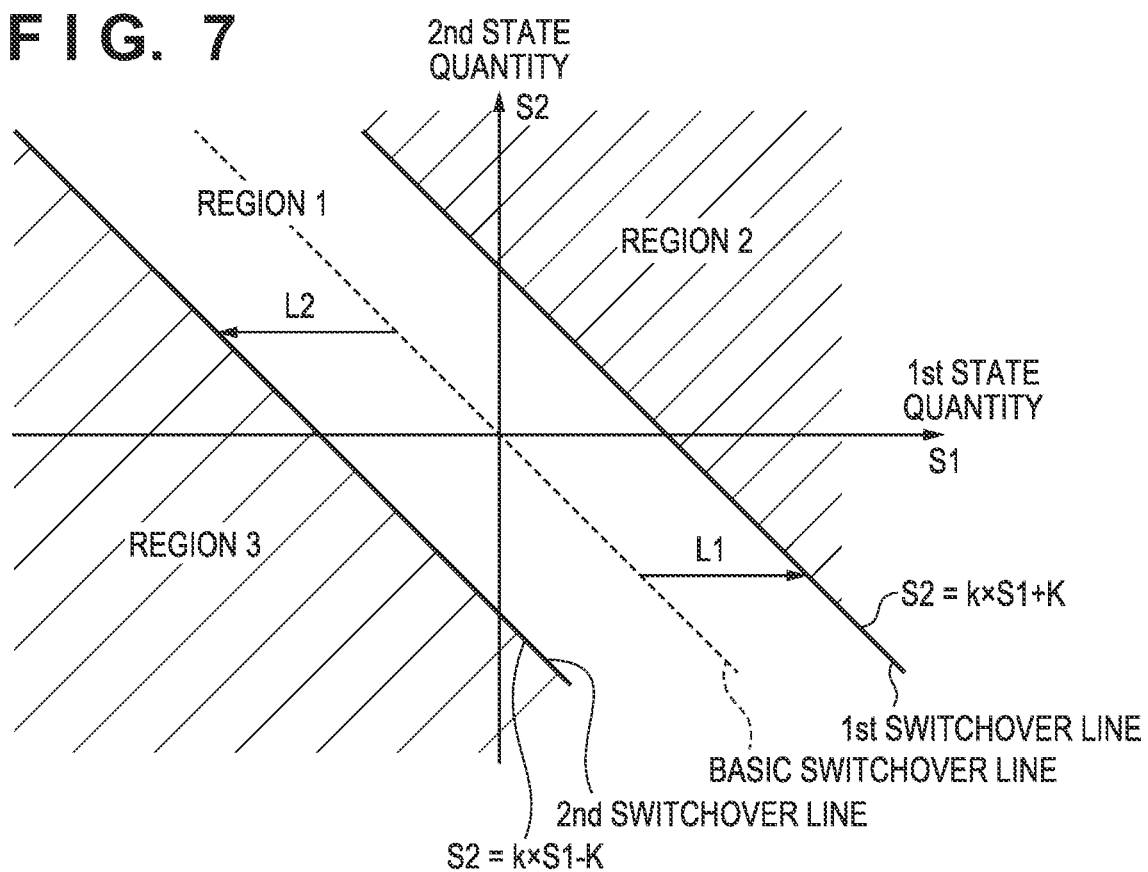
FIG. 7 is a view showing a state in which a two-dimensional coordinate space defined by the first state quantity and the second state quantity is divided by switchover lines.

FIG. 7 is a view showing a state in which a two-dimensional coordinate space defined by the first and second state quantities is divided by switchover lines. Referring to FIG. 7, the abscissa defines the first state quantity and the ordinate defines the second state quantity.

As shown in FIG. 7, three divided regions are defined in advance on the plane, and the plane is divided into three regions by the above-described linear function called a switchover line. These divided regions will be referred to as regions 1, 2, and 3 hereinafter. The function representing the switchover line includes two linear functions respectively represented by relationships "S2=k×S1+K" and "S2=k×S1−K" where S1 represents the first state quantity and S2 represents the second state quantity. Note that k represents the switchover coefficient.

As shown in FIG. 7, an upper region (hatched by diagonal lines) with respect to the first switchover line (S2=k×S1+K) is region 2, a lower region (hatched by diagonal lines) with respect to the second switchover line (S2=k×S1−K) is region 3, and a region between regions 2 and 3 is region 1. Note that in the example shown in FIG. 7, the region is divided symmetrically with respect to a basic switchover line (S2=k×S1) indicated by a dotted line. However, the region need not be divided symmetrically. In other words, in FIG. 7, L1=L2 need not be satisfied and L1≠L2 may hold.

Although a value for each region may be arbitrary, for example, a value for region 1 can be determined to be zero and values for regions 2 and 3 can be determined to be values whose absolute values are equal to each other and whose signs are different from each other. Note that the switchover coefficient is updated by a register setting value output from the preprocessing calculation unit 38. The second control unit 24 outputs such operation quantity as the second operation quantity to the control target 21 via the synthesizing unit 26.

The first operation quantity is updated every time the PID control calculation unit 36 is executed. The carriage motor driving control unit (carriage motor driver) of the printing apparatus to which the feedback control shown in FIG. 1B is applied often executes control calculation at a period of about 1 KHz. On the other hand, the second operation quantity is updated every time the sliding mode control calculation unit 39 is executed. A change in pulse of the encoder signal is assumed, and control calculation is executed at a period of about several kHz to 20 kHz. For such inputs having an asynchronous relationship, the synthesizing unit 26 adds them while adjusting the timings. The synthesizing unit 26 outputs a PWM signal based on the addition result of the operation quantities to the carriage motor driver 640. The carriage motor driver 640 rotates the carriage motor 5, and the carriage 3 moves through the timing belt 7.

To implement high-speed calculation derived from a change in pulse of the encoder signal, it is assumed that the sliding mode control calculation unit 39 is executed by hardware such as an ASIC.

Referring to FIG. 5, a range surrounded by a two-dot dashed line is implemented in the ASIC 603. As is apparent from FIG. 5, the ASIC 603 is responsible for the functions of the sliding mode control calculation unit 39, the control quantity estimation unit 23, the state quantity estimation unit 25, and the synthesizing unit 26. To the contrary, in FIG. 5, a range surrounded by a thick dotted line is implemented when the MPU 601 executes a program. As is apparent from FIG. 5, the MPU 601 is responsible for the functions of the PID control calculation unit 36, the target value calculation unit 35, and the preprocessing calculation unit 38.

The reason why the MPU 601 and the ASIC 603 share the feedback control is that the update period of the information processed in the portion implemented by the ASIC 603 is shorter than that of the information processed in the portion implemented by the MPU 601.

The preprocessing calculation unit 38 is also executed every time the target value calculation unit 35 updates the target value, and the latest register setting value is set in the register area of the ASIC 603. The preprocessing calculation unit 38 performs calculation for managing, as parameter values, only during the calculation period of the PID control calculation unit 36, some of variable values that change moment by moment in calculation of the switchover line executed by the sliding mode control calculation unit 39 or estimation calculation of the state quantity estimation unit 25. Execution of all the feedback control by the ASIC leads to increasing the size of the integrated circuit, and there is a lack of flexibility and versatility of processing. Thus, in this embodiment, the calculation accuracy and the circuit scale are compromised, and the preprocessing calculation unit 38 of the MPU executes part of calculation at the update timing.

A control parameter to be used by the sliding mode control calculation unit 39 may be changed in accordance with the operation state of the carriage 3. In this case, based on the target value of the target value calculation unit 35, a section of one of an acceleration state, a constant velocity state, and a deceleration state, in which the carriage 3 is located is determined. By changing, for each section, the switchover coefficient to be used to calculate the switchover line, an appropriate switchover line according to a carriage operation condition is selected to implement rapid convergence.

The effect of suppression of the carriage velocity vibration according to the above-described embodiment will now be described by performing comparison with a result obtained by conventional control.

Figure 8A:
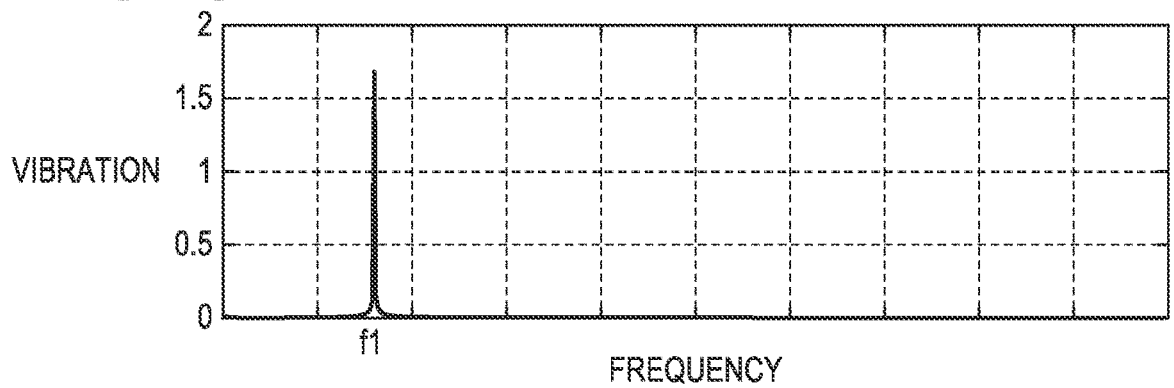
FIGS. 8A and 8B are graphs each showing carriage vibration suppression effect using a conventional art.
Figure 8B:
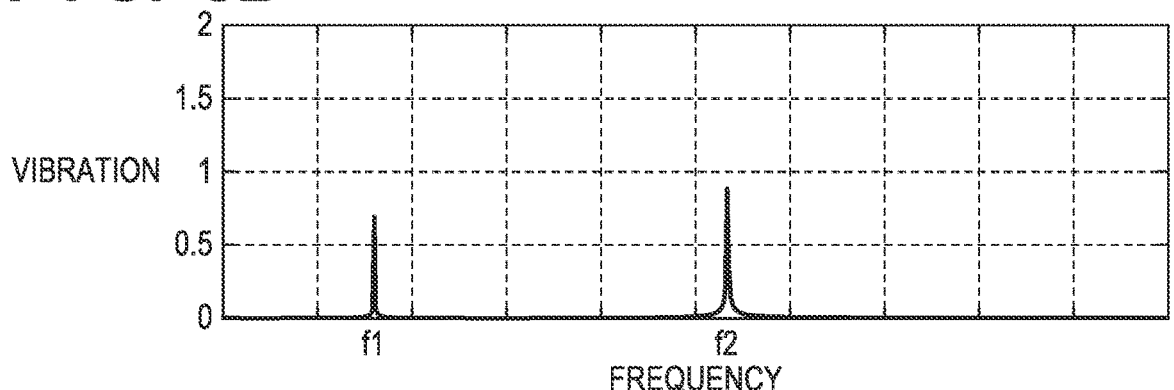
Figure 9A:
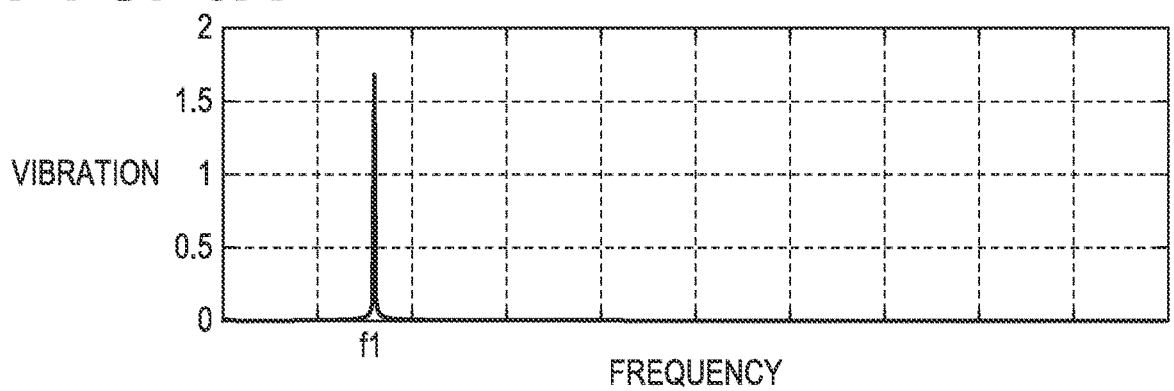
FIGS. 9A and 9B are graphs each showing carriage vibration suppression effect according to the embodiment of the present invention.
Figure 9B:
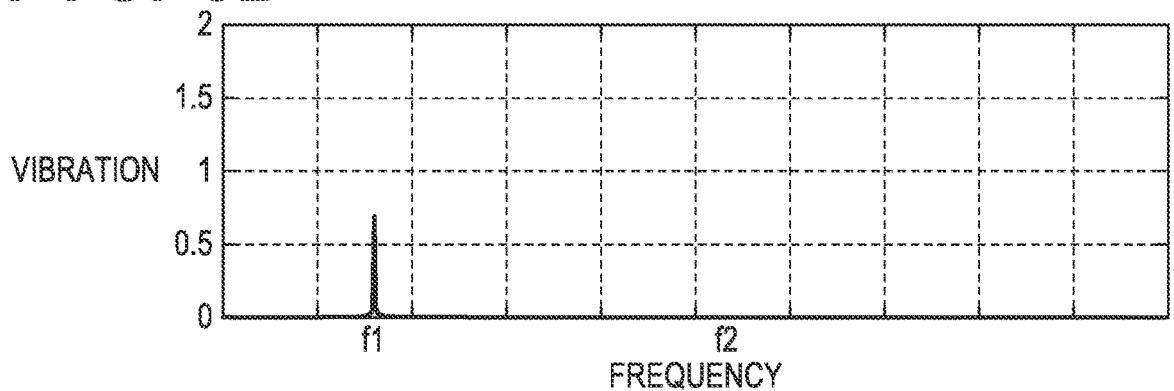

FIGS. 8A and 8B are graphs each showing the effect of carriage vibration suppression using the conventional technique. FIGS. 9A and 9B are graphs each showing the effect of carriage vibration suppression according to this embodiment. Referring to FIGS. 8A to 9B, the abscissa represents a frequency and the ordinate represents a vibration spectrum amplitude. FIGS. 8A and 9A each show a carriage vibration characteristic obtained when no carriage vibration suppression control is performed, and shows a frequency characteristic obtained under the same condition. To the contrary, FIGS. 8B and 9B respectively show a frequency characteristic obtained when conventional carriage vibration suppression control is executed, and that obtained when carriage vibration suppression control according to this embodiment is executed.

Referring to FIGS. 8A and 9A, if no carriage vibration suppression control is performed, a carriage vibration occurs at a frequency f1.

If the conventional carriage vibration suppression control is executed, a problem occurs in which while a carriage vibration decreases at the frequency f1, a carriage vibration occurs at another frequency f2, as is apparent by comparing FIGS. 8A and 8B.

On the other hand, if the carriage vibration suppression control according to this embodiment is executed, while a carriage vibration decreases at the frequency f1, no carriage vibration increases at any other frequencies including the frequency f2, as is apparent by comparing FIGS. 9A and 9B.

Therefore, according to the above-described embodiment, when the feedback control arrangement formed from the first and second control units is applied to the carriage driving control of the printing apparatus, it is possible to suppress a carriage velocity vibration. More specifically, it is possible to appropriately suppress a carriage velocity vibration in all the frequency regions by appropriately adjusting the output of the second operation quantity in the sliding mode control calculation unit based on the relationship between the carriage velocity error quantity and the acceleration error quantity. This implements more stable carriage driving, thereby making it possible to implement high-quality image printing.

Note that in the above-described embodiment, as shown in FIG. 7, the two-dimensional space representing the relationship between the two variables of the first and second state quantities is divided into the three regions by the two switchover lines, and the second operation quantity is adjusted in accordance with which of the divided regions includes the velocity error quantity and the acceleration error quantity. However, the present invention is not limited to this.

Figure 10:
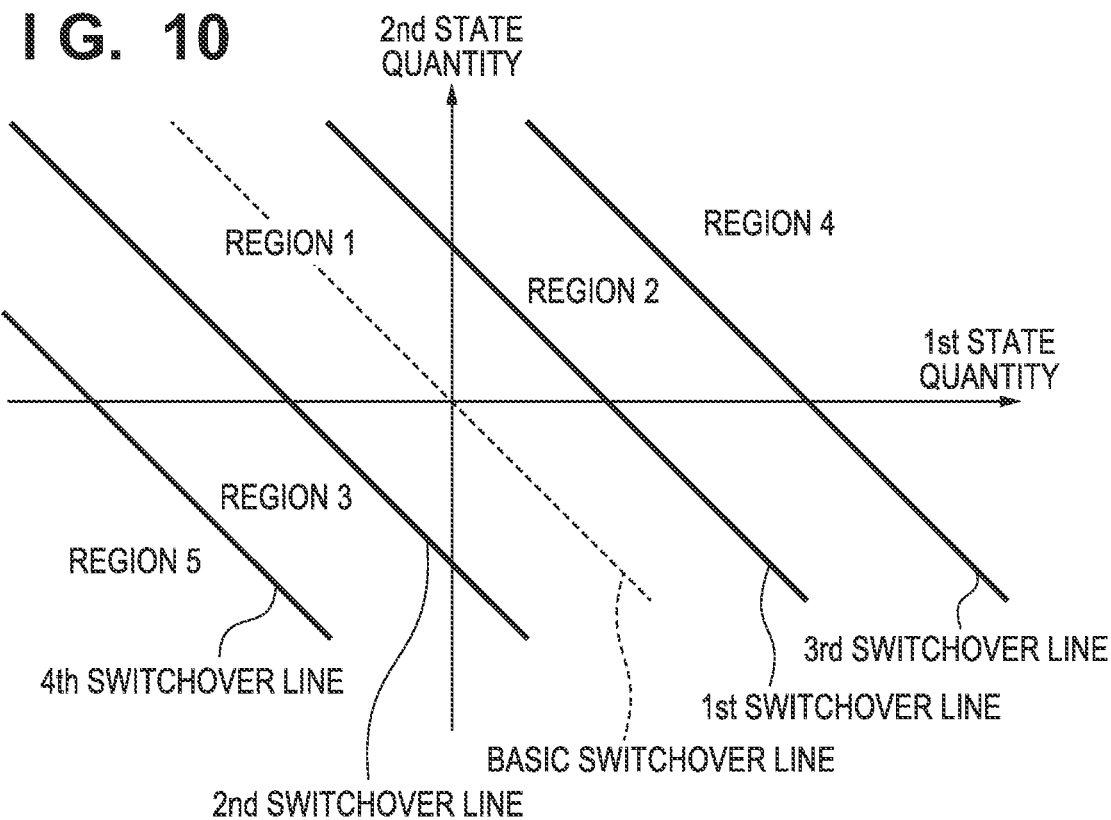
FIG. 10 is a view showing another example in which the two-dimensional coordinate space shown in FIG. 7 is divided.

For example, as shown in FIG. 10, the two-dimensional space may be divided into five regions by four switchover lines, and the second operation quantity may be adjusted in accordance with which of the divided regions includes the velocity error quantity and the acceleration error quantity. In the case of such region division, for example, a value for region 1 may be determined to be zero, values for regions 2 and 3 may be determined to be values whose absolute values are equal to each other and whose signs are different from each other, and values for regions 4 and 5 may be determined to be values whose absolute values are larger than those of the values for regions 2 and 3 and are equal to each other and whose signs are different from each other. If the error quantity is large, it is possible to reduce the influence of the carriage vibration within a shorter time by making the operation quantity large.

All the switchover lines for region division shown in FIGS. 7 and 10 can be represented by linear functions, and division is performed symmetrically with respect to the basic switchover line. The present invention, however, is not limited to this.

Figure 11:
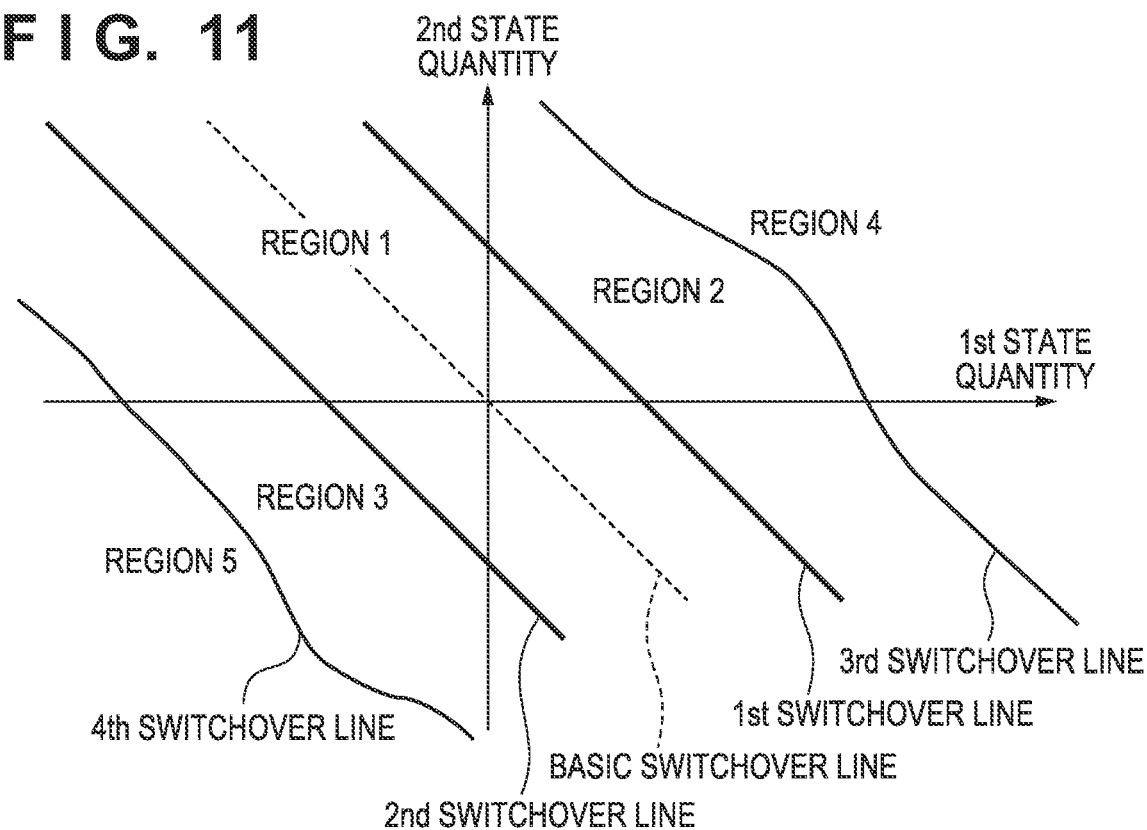
FIG. 11 is a view showing still another example in which the two-dimensional coordinate space shown in FIG. 7 is divided.

For example, as shown in FIG. 11, switchover lines may be defined by curves, and the curves may be symmetrical or asymmetrical with respect to a basic switchover line (dotted line). Furthermore, the operation quantity corresponding to region 1 shown in FIG. 7 or 10 is not limited to 0. For example, values which are smaller than the absolute values of the operation quantities corresponding to regions 2 and 3 and whose signs are different with respect to the "basic switchover line" in FIG. 7 or 10 may be used. In this case as well, as compared with a case in which the space is divided into only two regions 2 and 3 by the "basic switchover line", the influence of a calculation delay, a delay in acquisition of the state quantity, or the like becomes small.

4. Explanation of Another Application Example of Feedback Control

The present invention is applicable to any control of moving an object by driving the motor, as described above. Therefore, the present invention is applicable to, for example, control of the scanner motor that moves the CCD sensor or the CIS of the scanner apparatus having a single function or the scanner unit of a multi-function printer (MFP).

To ensure the image reading performance, the scanner unit needs to acquire an image signal by matching the movement quantity of the scanner unit and the light source lighting timing of the CCD sensor or the CIS. Since the light source lighting timing generally assumes that the moving velocity of the scanner unit is constant, it is important to suppress the velocity vibration of the scanner unit. Therefore, since the vibration target to be suppressed is the moving velocity of the scanner unit, the combination of the state quantities of the velocity and the acceleration is applied to the above-described second control unit. Basically, control is performed with the same arrangement as the carriage control arrangement described with reference to FIG. 5.

This can suppress a micro-vibration at a high-frequency of the scanner unit, which cannot be suppressed by only the conventional control, and improve the feedback control traceability. As a result, high-quality image reading can be achieved.

The present invention is also applicable to conveyance roller driving control of the printing apparatus described with reference to FIGS. 4 and 5. The printing apparatus rotates the conveyance roller for each carriage scanning operation to intermittently convey the print medium. To suppress a conveyance quantity vibration at this time, feedback control according to the present invention can be applied. In this case, since the control target object is the conveyance quantity (position vibration) of the print medium, the rotation quantity and rotational velocity of the conveyance roller are respectively input as the first and second state quantities to the above-described second control unit.

This can implement more precise conveyance control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-087537, filed Apr. 27, 2018, which is hereby incorporated by reference herein in its entirety.

What is claimed is:

1. An electric apparatus for controlling movement of a target object, comprising:
a detection unit configured to detect the movement of the target object;
a generation unit configured to generate, based on a detection signal output from the detection unit, a first operation quantity for first feedback control for the target object at a first period;
an estimation unit configured to estimate, based on the detection signal output from the detection unit, a first state quantity of the target object and a second state quantity obtained by time differentiation of the first state quantity in order to perform second feedback control for the target object at a second period shorter than the first period; and
a determination unit configured to determine a second operation quantity for the second feedback control, in accordance with which of a plurality of regions includes the first state quantity and the second state quantity, the plurality of regions being obtained by dividing a two-dimensional space defined by two variables of the first state quantity and the second state quantity estimated by the estimation unit,
wherein the target object is controlled based on the first operation quantity and the second operation quantity,
the plurality of regions include a first region, a second region and a third region, the first region being provided between the second region and the third region, and
the determination unit determines the second operation quantity so that the second operation quantity in a case where the first state quantity and the second state quantity are located in the first region is less than the second operation quantity in a case where the first state quantity and the second state quantity are located in the second region or the third region.

2. The apparatus according to claim 1, wherein the determination unit determines the second operation quantity to be zero in a case where the first state quantity and the second state quantity are located in the first region.

3. The apparatus according to claim 2, further comprising an input unit configured to input a target value of the first state quantity and a target value of the second state quantity for the second feedback control,
wherein the two-dimensional space is defined by a first error between the first state quantity and the target value of the first state quantity input by the input unit and a second error between the second state quantity and the target value of the second state quantity input by the input unit.

4. The apparatus according to claim 3, wherein if the first error and the second error are large, the determination unit determines a large value as a value of the second operation quantity.

5. The apparatus according to claim 3, wherein the two-dimensional space is divided into the plurality of regions by at least two division lines each defined by a linear function.

6. The apparatus according to claim 3, wherein the two-dimensional space is divided into the plurality of regions by at least two division lines each defined by a curve.

7. The apparatus according to claim 1, wherein
the electric apparatus comprises a printing apparatus configured to print on a print medium by a printhead by reciprocally moving a carriage mounted with the printhead, and
the target object comprises the carriage.

8. The apparatus according to claim 7, wherein
the first state quantity comprises a velocity of the carriage, and
the second state quantity comprises an acceleration of the carriage.

9. The apparatus according to claim 7, wherein
the detection unit includes an encoder sensor configured to detect a position of the carriage, and
the position of the carriage is estimated by counting a pulse signal of an encoder signal output from the encoder sensor, and a velocity of the carriage is estimated by measuring a pulse width of the pulse signal.

10. The apparatus according to claim 7, wherein
the generation unit is implemented by executing a program by a CPU, and
the estimation unit and the determination unit are implemented by an ASIC.

11. The apparatus according to claim 1, wherein
the electric apparatus comprises one of a scanner apparatus configured to read an image of an original by a scanner unit mounted with a CIS or a CCD sensor by moving the scanner unit, and a multi-function printer obtained by providing the scanner apparatus in a printing apparatus for printing on a print medium by a printhead by reciprocally moving a carriage mounted with the printhead,
the target object comprises the scanner unit,
the first state quantity comprises a velocity of the scanner unit, and
the second state quantity comprises an acceleration of the scanner unit.

12. The apparatus according to claim 1, further comprising a synthesizing unit configured to generate an operation quantity on the target object based on the first operation quantity and the second operation quantity,
wherein the target object is controlled based on the operation quantity generated by the synthesizing unit.

13. The apparatus according to claim 1, wherein the generation unit generates the first operation quantity based on a control quantity estimated based on the detection signal output from the detection unit.

14. The apparatus according to claim 13, wherein the control quantity includes a position or velocity of the target object.

15. A control method for an electric apparatus for controlling movement of a target object, comprising:
detecting the movement of the target object;
generating, based on a detection signal acquired in the detecting, a first operation quantity for first feedback control for the target object at a first period;
estimating, based on the detection signal acquired in the detecting, a first state quantity of the target object and a second state quantity obtained by time differentiation of the first state quantity in order to perform second feedback control for the target object at a second period shorter than the first period; and
determining a second operation quantity for the second feedback control, in accordance with which of a plurality of regions includes the first state quantity and the second state quantity, the plurality of regions being obtained by dividing a two-dimensional space defined by two variables of the estimated first state quantity and the estimated second state quantity,
wherein the target is controlled based on the first operation quantity and the second operation quantity,
the plurality of regions include a first region, a second region and a third region, the first region being provided between the second region and the third region, and
the second operation quantity is determined so that the second operation quantity in a case where the first state quantity and the second state quantity are located in the first region is less than the second operation quantity in a case where the first state quantity and the second state quantity are located in the second region or the third region.

16. The method according to claim 15, wherein in a case where the first state quantity and the second state quantity are located in the first region, the second operation quantity is determined to be zero.

17. The method according to claim 16, further comprising inputting a target value of the first state quantity and a target value of the second state quantity for the second feedback control,
wherein the two-dimensional space is defined by a first error between the first state quantity and the input target value of the first state quantity and a second error between the second state quantity and the input target value of the second state quantity.

18. The method according to claim 17, wherein if the first error and the second error are large, a large value is determined as a value of the second operation quantity.

19. The method according to claim 17, wherein the two-dimensional space is divided into the plurality of regions by at least two division lines each defined by a linear function.

20. The method according to claim 17, wherein the two-dimensional space is divided into the plurality of regions by at least two division lines each defined by a curve.

* * * * *